Aug. 21, 1956 A. KOSTKA ET AL 2,759,762
MOVABLE SPRAYING MACHINES
Filed April 14, 1953 2 Sheets-Sheet 1

Inventors:
August Kostka
Georges Kostka
By: Frank D. Prager
Atty:

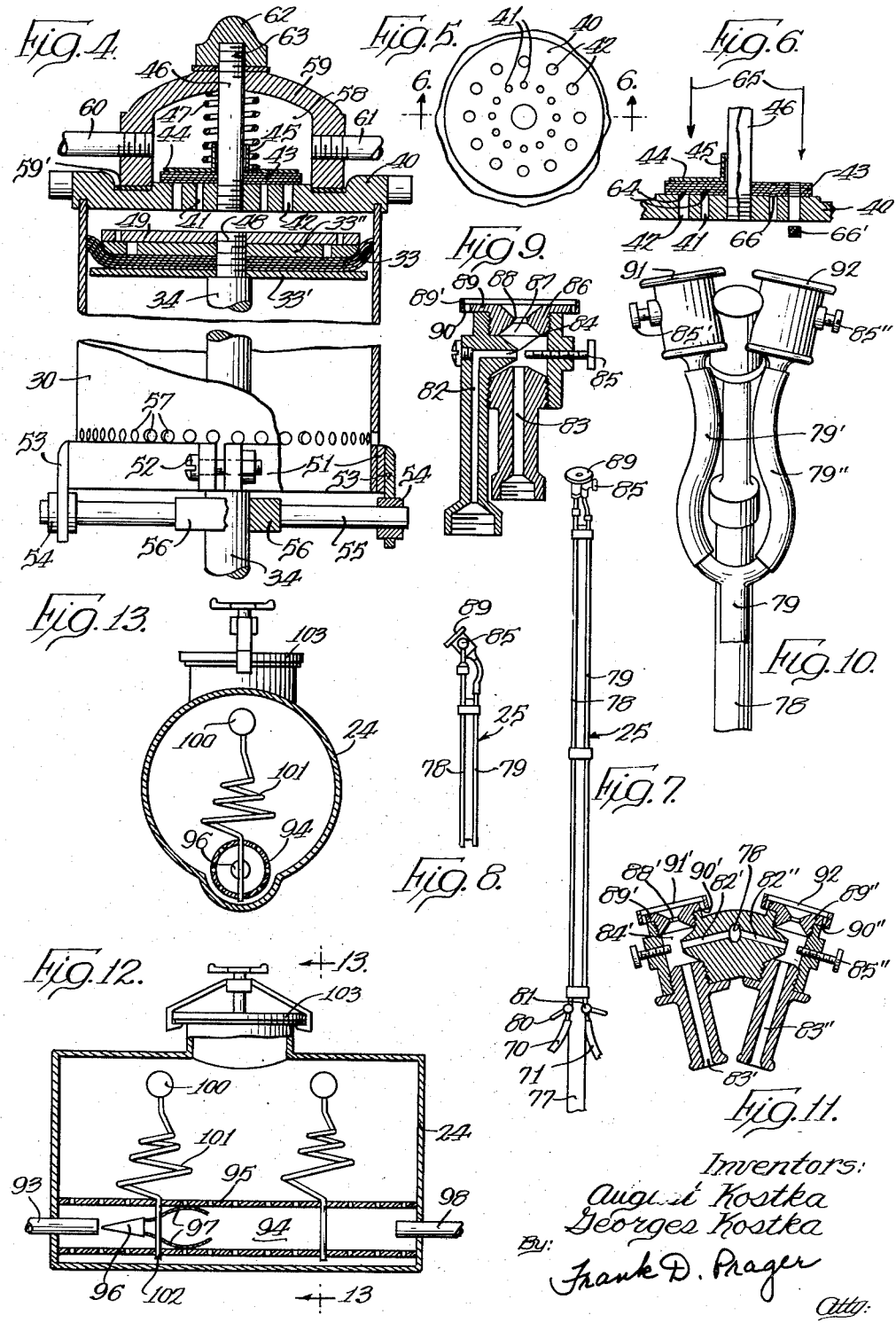

United States Patent Office 2,759,762
Patented Aug. 21, 1956

2,759,762

MOVABLE SPRAYING MACHINES

August Kostka, La Grange, Ill., and Georges Kostka, Les Ancizes, France, assignors, by direct and mesne assignments, of fifty per cent to said August Kostka and fifty per cent to John Basic, Downers Grove, Ill.

Application April 14, 1953, Serial No. 348,632

5 Claims. (Cl. 299—43)

This invention relates to movable spraying machines.

An object of this invention is to provide a movable spraying machine, desirably adapted to be used optionally for spraying liquid or pulverous materials and having a motor driven air compressor of simple and robust construction, the compressor being operable at a low pressure of a few atmospheres and at a low rotational speed so that no elaborate packing means are required for said compressor.

In this connection, it is a further object of the invention to provide a movable spraying machine and compressor having spraying nozzles or spraying heads capable of forming a low-pressure spray which is finely and uniformly distributed over all portions of a given area, the construction of said spray nozzles or heads being also such that no dripping therefrom will take place.

Other objects of the invention will appear as the description proceeds, reference being had to the accompanying drawings in which:

Fig. 4 shows a longitudinal section through one of the compressor cylinders, this figure being drawn at a larger scale than that used in Figs. 2 and 3;

Fig. 5 is a plan view of a detail of Fig. 4;

Fig. 6 is a section along the line 6—6 in Fig. 5, the right hand half of Fig. 6 being drawn under the assumption that a protective cover shown in the left hand half of Fig. 6 has been removed;

Fig. 7 is a front elevation and Fig. 8 a side elevation of one form of a spraying tool having a single spraying nozzle;

Fig. 9 is a vertical section through the spraying nozzle of the spraying tool shown in Figs. 7 and 8;

Fig. 10 is a front elevation of the nozzle end of a modified form of a spraying tool;

Fig. 11 is a vertical section through the double-nozzle of the spraying tool shown in Fig. 10;

Fig. 12 is a longitudinal section through the container for pulverous material; and Fig. 13 is a section along the line 13—13 in Fig. 12.

Figure 1:
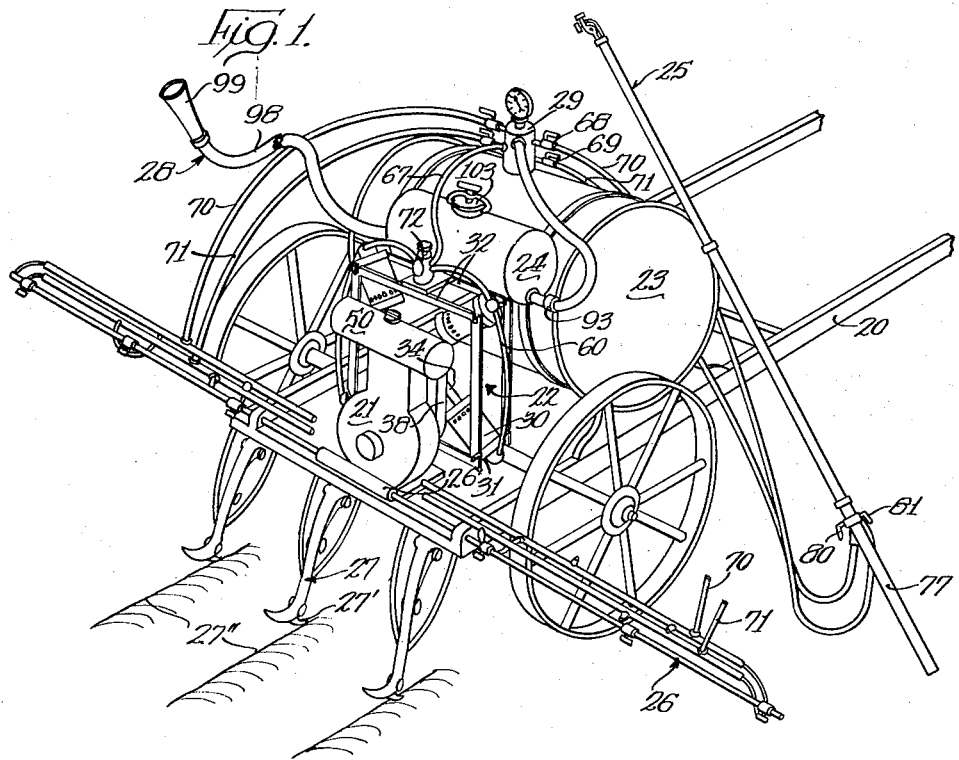
Fig. 1 shows by way of example in a perspective view one form of the spraying machine embodying the invention.

The spraying machine shown in Fig. 1 comprises the following main elements: a wheeled carriage 20, a motor 21, an air compressor 22, a container 23 for liquid spraying material, a container 24 for pulverous spraying material, spraying tools 25, 26, 27 and 28, and a distributor 29.

The spraying tool 25 is shown in a form suitable for spraying trees, the tool 26 in a form suitable for spraying plants growing near the ground or to either side of a roadway wide enough for the wheel distance of the machine, and the tool 27 in a form suitable for depositing spraying material into furrows immediately on these furrows being dug. The tool 28 is connected to the powder container 24. While all the tools 25 to 28 shown in Fig. 1 are such as will ordinarily be used for agricultural purposes, it is to be understood that spraying tools as described herein may be used for other purposes. As such other purposes there may be mentioned, e. g. the spraying of paints, or of liquid or pulverous disinfectants for animals, the spraying of impregnating fluids, etc.

Figures 2, 3:
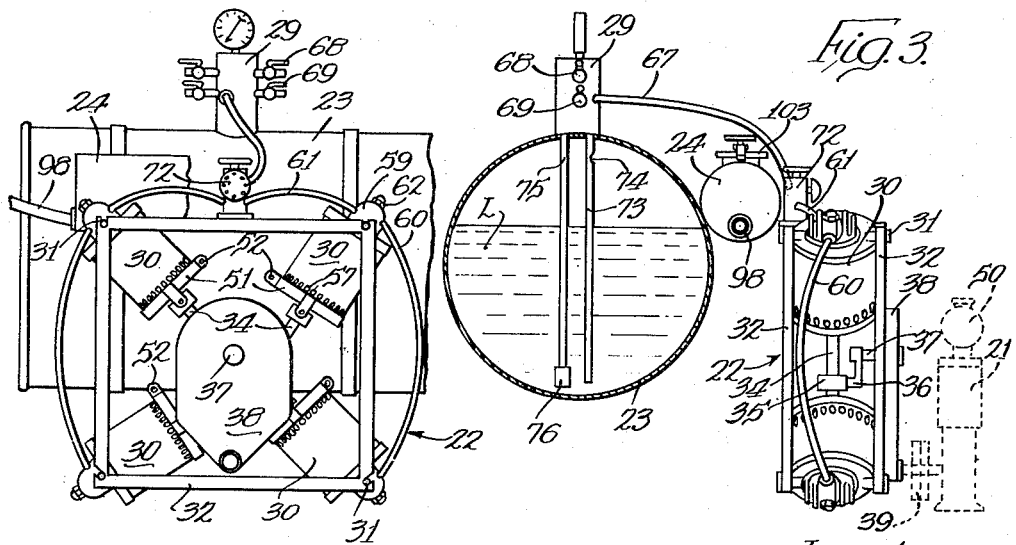
Fig. 2 is a front view of the liquid container and the compressor of the machine.
Fig. 3 is a side view, partly in section, of the elements shown in Fig. 2.

The compressor 22 is shown in the drawing as having four cylinders 30, each cylinder being pivotally mounted at 31 on one of the four corners of a rectangular frame 32. The compressor is designed to produce compressed air of relatively low pressure, such as an over-pressure of between two and five atmospheres. Reciprocable within each cylinder 30 is a piston 33 comprising a disc made of flexible material such as leather, rubber or the like held between two clamping plates 33' and 33". Extending through a central opening in the elements 33, 33' and 33" is a screw bolt 48 onto which there is screwed a lock washer 49. The screw bolt 48 forms the outer end of a piston rod 34 for the piston 33. The inner end of the piston rod 34 is linked at 35 to a crank 36 carried by a crank shaft 37. The crank shaft 37 is operable by the motor 21 over a clutch 39 and through a suitable step-down transmission gearing enclosed in a casing 38. This transmission gearing (not shown) is preferably so chosen as to provide for a rotational speed of the compressor of 100–150 R. P. M. The motor 21 may be of any suitable type, e. g. a gasoline motor, the gasoline tank being indicated in Figs. 1 and 3 by the reference numeral 50. In view of the low pressure and the low speed at which the compressor 22 operates, the elastic disc 33 with its two clamping plates 33' and 33" is sufficient to serve the purposes of the piston proper and of the packing means for the piston as well. There are, therefore, no separate piston rings used in the construction shown in Fig. 4. If the elastic disc 33 should wear out after long use it can be easily replaced by a new elastic disc.

The inner end of each of the compressor cylinders 30 is embraced by a clamping ring 51, which can be tightened by means of a screw or screws 52 and has two extensions 53, each carrying a bearing 54 for the outer end of a stud 55. The inner end of each of the studs 55 is fastened to a guide bearing 56 for the piston rod 34.

The inner end (in Fig. 4 the lower end) of each cylinder 30 is open. At a position outwardly (in Fig. 4 upwardly) spaced from but near that open end the cylinder wall is provided with a series of holes 57 serving as air inlet openings.

When the piston 33 approaches the end of its inward stroke it passes the openings 57 in the wall of the cylinder 30 and permits air from the outside to enter the cylinder through these openings. In the cylinder there exists at this time a subatmospheric pressure so that air enters the cylinder at a corresponding rate. Next, the openings 57 are closed again by the returning piston 33, and the air in the cylinder 30 is placed under more than atmospheric pressure, as its compression by the piston 33 starts.

It is to be noted that the openings 57 of the cylinder wall in cooperation with the piston 33 form the only means for controlling the air inlet into the compressor.

At the outer end of each cylinder 30 (in Fig. 4 the upper end) there is provided a cover plate 40 having a plurality of axial holes 41 and 42 which may be arranged in two concentric circles, as shown in Fig. 5. These holes are controlled by a valve consisting of a plate 43 of flexible material, such as soft rubber. The rubber plate 43 is covered by a metal plate 44. This plate 44 has an upper tubular extension 45 which surrounds a guide pin 46 whose lower end is screwed into the plate 40. A spring 47 surrounding the pin 46 and the tubular extension 45 of the plate 44 normally holds the valve 43, 44, 45 down on the plate 40 so as to close the holes 41 and 42 of that plate 40.

The valve 43, 44, 45 and the spring 47 of each cylinder 30 are disposed within a chamber 58 inside of a dome-shaped member 59 which rests on a gasket 59' within a depressed portion of the cover plate 40 and carries one on two flexible pipes 60, 61. Two pipes 60 are provided, each interconnecting the chambers 58 of two adjacent cylinders 30 on one side of the compressor whereas two pipes 61 connect the two upper chambers 58 to a check and check valve 72 from which a flexible pipe 67 leads to the distributor 29.

The dome-shaped member 59 is held in place by a nut 62 screwed onto the threaded outer end 63 of the stem 46. Upon removal of the nut 62, the member 59, together with the pipes 60 and 61, can be removed to give access to the valve 43, 44, 45 and the spring 47, as well as to the stem 46. Thus, all the parts of the outlet valve of each compressor cylinder are extremely easily accessible for repair or exchange. At the same time these outlet valves will only very seldom give cause for trouble. If the valve member proper, i. e. the plate 43, is made of soft resilient material, e. g. soft rubber, then a small foreign particle which may have reached one of the openings 41, 42 and passed therethrough will embed itself in the lower surface of the rubber plate 43. At the following compression stroke of the piston 33 such particle will either be blown into the chamber 58 or will remain embedded in the valve member 43. In neither case will the operation of the outlet valve be impaired. In Fig. 6 two foreign particles 64 are shown imbedded in the resilient material of the valve member 43, this member being nevertheless in perfect closing position on the plate 40.

As has been mentioned before, there is arranged on the side of the resilient plate 43 which is remote from the plate 40 a metal plate 44 which, by means of the extension 45, is slidable on the stem 46. The purpose of the metal member 44, 45 is the following: Assuming that the metal member 44, 45 were absent, as shown in the right half of Fig. 6, it will be understood that the resilient member 43 would be subject to an overpressure in the direction of the arrows 65 when the piston 33 moves inwardly. Under the effect of this pressure upon the outer side and of the under-pressure upon the inner surface (lower surface in Fig. 4) of the resilient plate 43 those parts of the plate 43 which are situated directly above the openings 41 and 42 would penetrate those openings as shown in Fig. 6 at 66. After such deformation of the plate 43 has taken place for a great number of times, at least some of the portions of the resilient plate 43 located above the openings 41, 42 would become punched out as shown in Fig. 6 for the piece 66'. By providing a metal or other rigid plate 44, as shown in the left hand half of Fig. 6, the over pressures 65, which without the plate 44 would lead to damage of the resilient plate 43, are taken up by the plate 44 and have, therefore, no damaging effect on the resilient plate 43.

Should it become necessary to do repair work inside of any of the cylinders 30, such as exchanging the leather plate of the piston 33, the cylinder as a whole can be easily lifted out of the frame 32. For that purpose the clamping ring 51 is loosened by means of the clamping screw or screws 52 and then the cylinder is tilted so that its pivots 31 come off the frame 32. In some cases it will be advisable or necessary to screw the pipes 60 and 61 out of the member 59. If also the outlet valve is desired to be inspected, it will in some cases be preferable to remove the nut 62 and then to remove from the cylinder the member 59 together with the pipes 60 and 61.

When the motor 21 is operatively connected to the compressor 22 by means of the clutch 39, the four pistons 33 of said compressor deliver one after the other compressed air into their coordinated chambers 58. From the chambers 58 the air flows over the check valve 72 and the pipe 67 to the distributor 29.

A tube 73 leads from the distributor 29 to a point near the bottom of the liquid container 23. Near its upper end the tube 73 has an opening 74 through which part of the compressed air enters directly the space in the container 23 above the level of the liquid L, placing that liquid under pressure. The remaining compressed air passes through the entire length of the tube 73 and leaves the latter at the lower end thereof. In reascending through the liquid L, the air exercises a strong stirring action upon this liquid. The air pressure created in the liquid container 23 forces part of the liquid therein to pass through a filter 76 at the lower end of a pipe 75 into said pipe 75 and from there back into the distributor 29.

The distributor 29 serves as a distributing device to the spraying tools 25, 26, 27, for compressed air as well as for spraying liquid. The distributor 29 is divided for that purpose, in any suitable manner (not shown), into an upper portion for the liquid and a lower portion for the compressed air. The upper portion is equipped with a plurality of cocks 68 and the lower portion with a plurality of cocks 69, each pair of cocks 68 and 69 being thus able to supply liquid and compressed air to any of the spraying tools 25, 26 or 27 through a pair of flexible pipes 70, 71. Two pairs of cocks 68, 69 are visible in the drawing and, ordinarily, two such pairs of cocks 68, 69 will be sufficient for all practical purposes. However, there may be any number of such pairs of cocks; and the same pair of cocks 68, 69 and pipes 70, 71 can be used for attaching thereto, successively, different spraying tools.

In Figs. 7 to 9 there is shown a form of a tool for spraying liquid which has been found to be very advantageous, by itself and as a part of the machine shown in Fig. 1. (In Fig. 1 that spraying tool is identified by the reference numeral 25.) It has a handle 77 which carries two tubes 78 and 79. The tube 78 is provided with a cock 80 for controlling the amount of liquid coming through the flexible pipe 70 and the tube 79 has a cock 81 for controlling the amount of air supplied by the pipe 71. The liquid tube 78 communicates with a liquid channel 82 of a spraying nozzle shown in detail in Fig. 9. The air tube 79 communicates with an air channel 83 in said spraying nozzle. The liquid channel 82 is so shaped that it terminates at an outlet part 84 discharging across and directly above the air channel 83. Above the end of the air channel 82 and opposite the port 84 is a control member 85, whose distance from the port 84 may be varied. In the example shown the control member 85 is in the form of a preferably conically shaped end of a bolt screwed through the side wall of the spraying nozzle. By screwing the member 85 farther inwardly into the nozzle the distance of the inner end of the member 85 from the port 84 is reduced. By turning the member 85 in the opposite sense the distance of its inner end from the port 84 is increased. In the construction just described the liquid and the air meet at a point where the liquid is being atomized in consequence of its hitting the conical end of the member 85. The liquid-air mixture forming at that point enters a channel 87 of double frusto-conical shape in a member 86, the narrowest portion of the channel 87 being denoted by the reference numeral 88.

The member 86 terminates in a dish-shaped plate 89 which near its upwardly bent outer rim 89' has a number of holes 90. Through these holes 90 outside air is drawn when the mixture of liquid and compressed air leaves the member 86. The outside air sucked in through the holes 90 is guided in axial direction for a short distance by said outer rim of the dish-shaped plate 89 and forms a kind of air screen. This air screen prevents dripping down from the plate 89 of spraying liquid which, instead of having been carried along by the main current delivered by the nozzle, has accumulated in droplet form on the plate 89. Any such droplets will flow back into the nozzle as soon as the air pressure is temporarily shut off. Upon the nozzle being put in operation again, the small amount of liquid which has flown back into the nozzle will be mixed with air and carried out of the nozzle together with the liquid coming through the liquid pipe 78.

The nozzle shown herein, connected with the low-pressure compressor cylinder 30, produces a cone of spraying material which is uniform over its entire cross section so that no empty spaces are left over the area of the target delimited by said cone of spraying material when the nozzle is held stationary. Preferably the nozzle is arranged at an angle of approximately 45° to the direction of the tubes 78, 79. Such an inclination of the nozzle facilitates the spraying of targets of extended height or area, e. g. the spraying of a large crown of a tree.

In Figs. 10 and 11 a spraying head is shown which comprises two spraying nozzles 91 and 92 arranged at an angle to each other of approximately 30°. The head as a whole may again be arranged at an angle to the direction of the air and liquid pipes 78, 79 of, say, 45° which is the same as the angle the nozzle head shown in Figs. 7 to 9 includes with the pipes 78, 79. Each of the two nozzles 91 and 92 is constructed substantially similarly to the nozzle shown in Fig. 9, the same reference numbers being used in Figs. 10 and 11 as are used for the corresponding elements in Figs. 7 to 9, with the difference that the numbers in Figs. 10 and 11 are followed by either the index ′ or the index ″. Since the two nozzles 91 and 92 are each of substantially the same construction as the nozzle shown in Fig. 9 it will be obvious that each of said two nozzles 91 and 92 produces a cone of spraying material which is uniform over its entire cross section.

Whether the spraying head shown in Fig. 9 or the spraying head shown in Fig. 11 is used, in either case the spraying material leaves the spraying head in such fine distribution that at a distance from the nozzle where the propulsion originally imparted to said spraying material has substantially ceased, the material is in the form of a very fine fog. If desired, such fog can be made so fine that it has no tendency to fall to the ground since it is supported by the surrounding outside air.

The spraying heads of either the tools 26 or the tools 27 may have nozzles substantially similar to the nozzle shown in Fig. 9 or the double nozzle shown in Fig. 11. The tool 26 consists in a manner known per se of two halves which may either be used in horizontal position as shown in Fig. 1, where the two halves are shown held together by a coupling device 26′, or in vertical position (not shown). The spray nozzles of the tools 27 are mounted on supports extending downwardly from the one end of the carriage 20 and carrying each at or near its free end a harrow tooth 27′ adapted to dig a furrow 27″ in the soil over which the carriage travels. The spraying nozzles being arranged immediately behind each tooth 27′, an insecticide or the like can be deposited in each furrow as the digging of this furrow progresses.

Any desired amount of compressed air produced by the compressor 22 can be supplied through a flexible tube 93 to the container 24 for pulverous material. The tube 93 connects the distributor 29 with one side of the container 24 where this tube opens into a wider tube 94 which extends lengthwise through the container 24 and has distributed over its entire surface holes 95. Within the tube 94 and opposite to the end of the tube 93 there is arranged a deflector 96 which is movable axially within the tube 94 and is held in any desired axial position by means of spring holders 97. Another flexible pipe 98 leads from the container 24 to the outside, carrying at its free end a spraying head 99 (Fig. 1).

When the compressed air coming through the tube 93 leaves that tube, it is directed towards the inner wall of the tube 94 by means of the deflector 96. Depending on the distance at which the deflector 96 has been arranged with relation to the outlet end of the tube 93, the deflected compressed air will exercise a suction effect of greater or smaller magnitude on the powder in the container 24, sucking into the tube 94 through the holes 95 larger or smaller amounts of the powder. The air current then carries the powder into and through the flexible pipe 98 and into the spraying head 99.

Various materials are commonly used as spraying powders. Some of these materials are of such a nature that the particles forming the powder have a strong tendency for "baking together" so as to form lumps. Such lumps cannot be drawn through the small holes 95 of the tube 94 and the material forming the lumps remains unused in the container 24, at least until it has been broken up again into small enough particles.

In order to avoid the "baking together" of all or part of the powder in the container 24, there are provided inside of the container 24 a number of elements 100, each carried by a coiled spring 101 terminating in a straight holding member 102 extending through two opposite holes 95 in the tube 94. Whenever the motor 21 of the machine is running, it will cause the container 24 to vibrate at least slightly and those slight vibrations are sufficient to make the vibrators 100, 101, carried by the tube 94, carry out sufficiently strong vibrations to prevent "baking together" of the powder in the container 24 and to break up lumps that have already formed. Still stronger vibrations are imparted to the vibrators 100, 101 when the spraying machine is moved over the ground, particularly if the ground is bumpy.

The vibrators 100, 101 can be removed from the container 24 if the material to be held in that container is of such a nature as not to "bake together" when at complete rest for an extended length of time. The vibrators can be removed after a manhole cover 103 has been opened.

While we have shown and described one specific embodiment of the machine according to our invention, and specific forms of spraying nozzles, we desire it to be understood that the specific embodiments have been given by way of example only and that various changes, modifications and rearrangements of parts may be made without deviating from the spirit of the invention or the scope of the appended claims.

What we claim is:

1. A spraying tool including a nozzle having at least one liquid channel and one air channel whose axes intersect, a Venturi member following the point of intersection of the axes of said liquid channel and said air channel, said Venturi member terminating in a dish-shaped plate having at its outer circumference an upwardly bent rim and near said rim a number of holes, said holes being adapted in cooperation with said rim to form during the operation of the nozzle an air screen preventing dripping down of spraying liquid from said plate.

2. A spraying tool as defined by claim 1, wherein said air channel in said nozzle communicates with an air pipe and said liquid channel with a liquid pipe, said two pipes being arranged parallelly to each other, and said nozzle being arranged at an angle to the direction of said two pipes.

3. A spraying tool as defined by claim 2, wherein the nozzle is arranged at an angle of approximately 45° to the direction of said two pipes.

4. A spraying tool including two nozzles each having a liquid channel and an air channel whose axes intersect, a Venturi member behind the point of intersection of the axes of said liquid channel and said air channel of each of said nozzles, each of said two Venturi members terminating in a dish-shaped plate having at its outer circumference a rim bent forwardly in the direction in which the respective nozzle discharges and near said rim a number of holes, said holes being adapted in cooperation with said rim to cause during the operation of the coordinated nozzle the formation of an air screen preventing dripping down of spraying liquid from said plate.

5. For a movable spraying machine having a motor driven air compressor and a container for liquid spraying material, a spraying tool including two nozzles each having a liquid channel and an air channel whose axes intersect, a Venturi member behind the point of intersection of the axes of said liquid channel and said air channel of each of said nozzles, each of said two Venturi members terminating in a dish-shaped plate having at its outer circumference an upwardly bent rim and near said rim a number of holes, said holes in cooperation with said rim being adapted to enforce during the operation of the coordinated nozzle the formation of an air screen preventing dripping down of spraying liquid from said plate, the liquid channels and the air channels of both said nozzles being connectable, respectively, to a liquid pipe and an air pipe, said two pipes being arranged parallelly to each other, said two nozzles being arranged at an angle to each other of approximately 30°, and both said nozzles being arranged at an angle of approximately 45° to the direction of said two pipes.

References Cited in the file of this patent

UNITED STATES PATENTS

| | | |
|---|---|---|
| 319,647 | Weatherhead | June 9, 1885 |
| 388,766 | D'Lanoy | Aug. 28, 1888 |
| 495,735 | Herscher | Apr. 18, 1893 |
| 634,524 | Franklin | Oct. 10, 1899 |
| 978,258 | Zimmer | Dec. 13, 1910 |
| 1,055,611 | Clarke | Mar. 11, 1913 |
| 1,075,947 | Schurs | Oct. 14, 1913 |
| 1,116,341 | Aborn | Nov. 3, 1914 |
| 1,728,455 | Taylor et al. | Sept. 17, 1929 |